Figure 1:
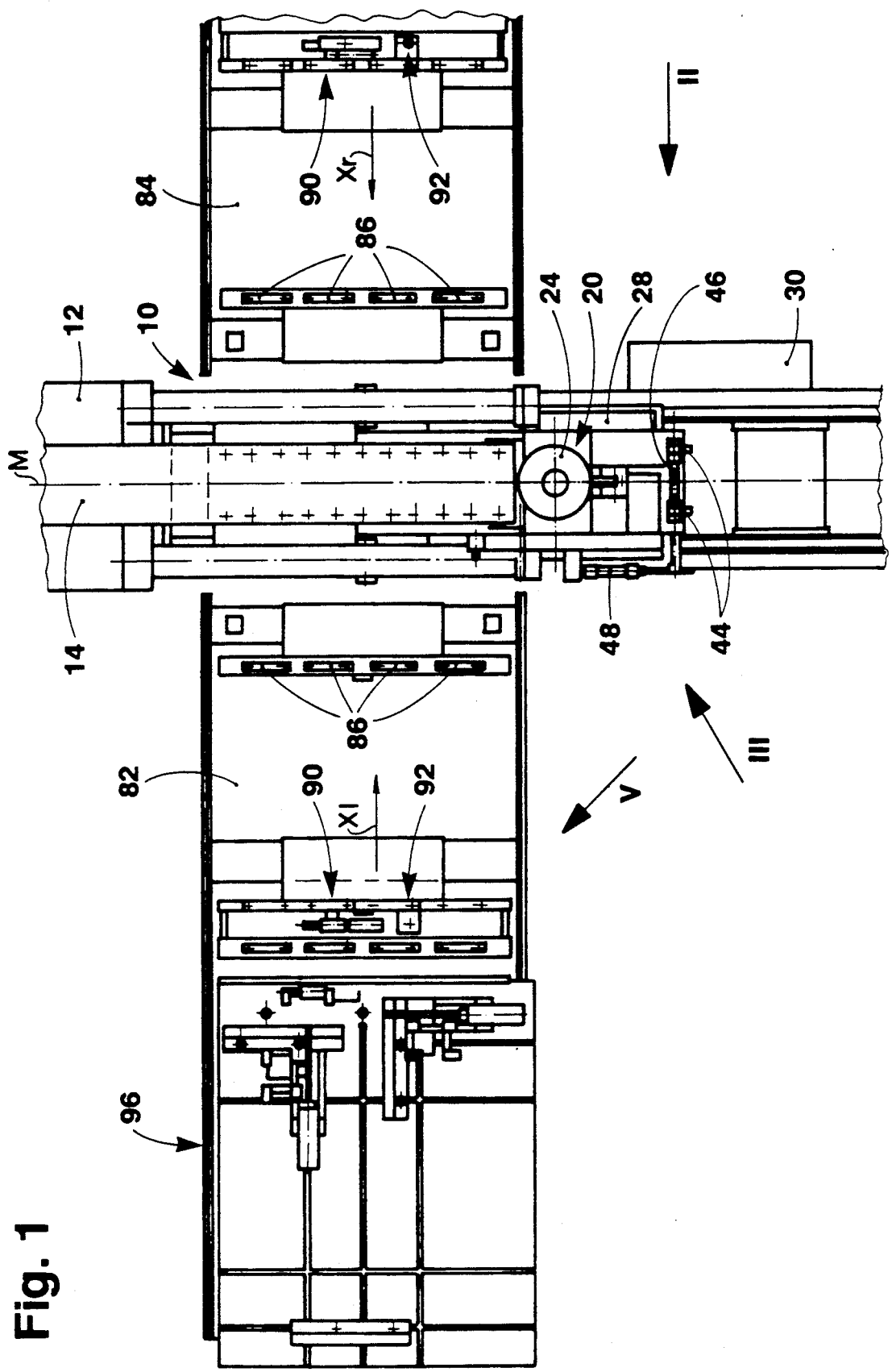

United States Patent [19]

Beyer et al.

[11] Patent Number: 5,081,331
[45] Date of Patent: Jan. 14, 1992

[54] BODY BLANK WELDING MACHINE

[75] Inventors: Eduard Beyer, Gossau; Floring Cadalbert, Winterthur, both of Switzerland

[73] Assignee: Elpatronic AG, Zug, Switzerland

[21] Appl. No.: 512,967

[22] Filed: Apr. 23, 1990

[30] Foreign Application Priority Data

Jan. 29, 1990 [CH] Switzerland .................. 00267/90

[51] Int. Cl.$^5$ .............................................. B23K 1/16
[52] U.S. Cl. ........................................ 219/64; 219/81
[58] Field of Search ................................. 219/64, 81

[56] References Cited

U.S. PATENT DOCUMENTS 4,732,026  3/1988  Ban ................................ 219/64 X
4,803,325  2/1989  Frei et al. ............................ 219/64

OTHER PUBLICATIONS

"Industrie—Anzeiger" 83/1989, pp. 30-31.

Primary Examiner—Marvin M. Lateef
Attorney, Agent, or Firm—McCormick, Paulding & Huber

[57] ABSTRACT

Disposed on a central machine portion (10) are two clamping devices (32,34), each for a respective body blank ($P_l, P_r$), and a welding device (20) for welding together overlapping margins of the blanks ($P_l, P_r$). Disposed one at each side of the central machine portion (10) are feed tables (80,82) on each of which a blank ($P_l R_r$) can be fed through one of the clamping devices (32,24), transversely to the proposed weld seam, into an overlapping position. A supporting device (50) is disposed between the two clamping devices (32,34) to support the margin to be welded of the blank ($P_l$) fed in on one of the two feed tables (80). This supporting device can be moved out of a supporting position in which it supports the margin to be welded of the blank ($P_l$) in question, into a position of rest in which it allows this margin to come to lie on the margin of the other blank ($P_r$).

6 Claims, 6 Drawing Sheets

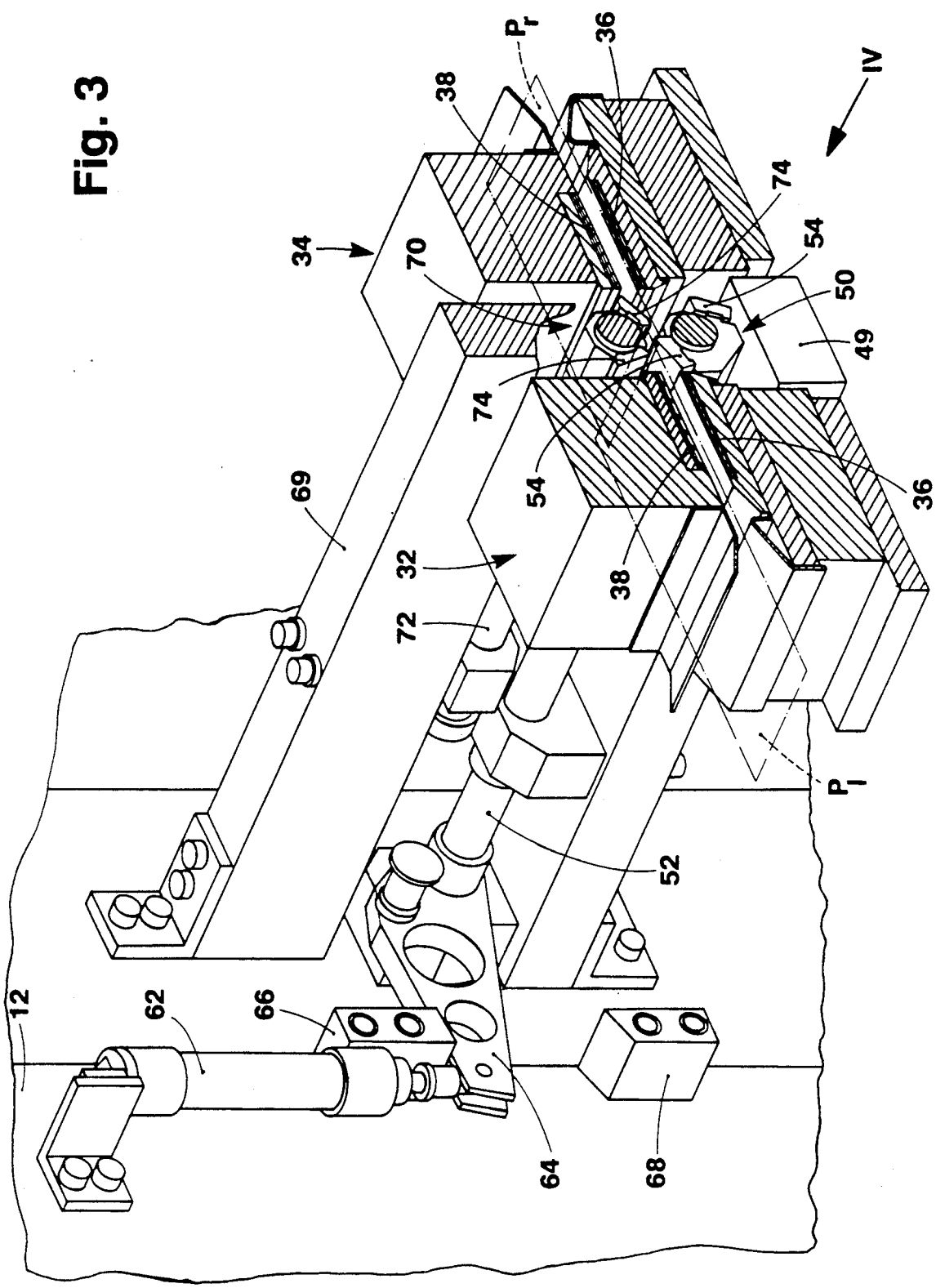

BODY BLANK WELDING MACHINE

The invention relates to a body blank welding machine having a central machine portion on which there are disposed two clamping devices, each for one body blank, and a welding device for welding together overlapping margins of the body blanks, a drive for producing a relative movement, along the proposed weld seam, between the welding device and the clamping devices and two feed tables which are each disposed at one side of the central machine portion and on each of which a body blank can be fed transversely to the proposed weld seam, through one of the clamping devices, into an overlapping position.

A known body blank welding machine of this kind (DE journal "Industrie-Anzeiger" 83/1989, pages 30/31) works in accordance with the roller seam welding technique with two electrode rollers which can be rolled on the margins of the body blanks overlapping one another in a narrow region, with such a pressure and under such an electrical current that a lap mash seam results. In this case, the necessary relative movement between the welding device and the two body blanks is produced in that the blanks are pushed forwards in the direction of the weld seam in relation to the electrode rollers. It is also possible, however, in a body blank welding machine of the kind described, to dispose the blanks in a fixed position during the welding and to allow the welding device to execute the necessary longitudinal movement in relation to the blanks.

In any case, it is necessary to displace the margin of the body blanks to be welded together, over one another in such a manner that they overlap by a given amount over their whole length. This amount must be adhered to particularly accurately, above all if a lap mash seam is to be welded.

The necessary overlapping of the body blanks can be adjusted, for example, by pushing each of the margins of the blanks to be welded to one another into a groove in a so-called Z-rail which is subsequently withdrawn. The profile of the Z-rail is so formed that the two body blanks cannot come into collision when their margins are being pushed one over the other and that which of the two margins comes to lie on the other is fixed once and for all. This determination is of particular importance, with regard to the subsequent use of the body blanks welded together, if the blanks consist of sheets of different thickness, quality or surface treatment.

The withdrawal of the Z-rail, hitherto usual, after the sheets have been located in their overlapped position, is complicated. If the Z-rail has not been withdrawn before the beginning of the welding, however, and instead the body blanks have only been moved out of the Z-rail by displacement of the clamping devices during the welding, it has not always been possible, particularly with relatively long weld seams, to adhere to a prescribed width of overlap with the accuracy aimed at.

It is therefore the object of the invention to guide the margins of body blanks to be welded to one another, without a Z-rail, in such a manner that they come into the necessary overlapping position during a feed movement transversely to the longitudinal direction of the proposed weld seam.

Starting from a body blank welding machine of the kind described at the beginning, the problem is solved, according to the invention, in that disposed between the two clamping devices in order to support the margin to be welded of the body blank fed onto one of the two feed tables is a supporting device which is displaceable out of a supporting position in which it supports the margin to be welded of the associated blank, into a position of rest in which it allows said margin to be laid on the margin of the other blank.

The supporting device according to the invention prevents even body blanks which are not absolutely plane, from striking against one another with the edges of their margins to be welded to one another, when being pushed together. In its position of rest, the supporting device no longer exerts any force on the blank previously supported by it; the blank margins to be welded to one another then lie one on the other in a plane which is determined solely by the arrangement of the clamping devices.

The supporting device may appropriately be pivotable backwards and forwards between the supporting position and the position of rest, about an axis parallel to the proposed weld seam.

In addition to the supporting device whereby the margin of one of the body blanks can be supported, in a preferred form of embodiment of the invention a holding-down device for the margin to be welded of the other body blank is further disposed between the two clamping devices. This arrangement of a supporting device and of a holding-down device renders it possible reliably to prevent the edges of the body blank margins to be welded to one another from striking against one another, even if each of these margins is raised or lowered only very slightly out of the associated plane of the blank.

The features described above are preferably developed further in that the supporting device comprises two supporting members arranged symmetrically, the holding-down device comprises two holding-down members arranged symmetrically, and supporting device and holding-down device can be pivoted backwards and forwards in opposite directions between two end positions, each about an axis parallel to the proposed weld seam, in each of which positions a supporting member is obliquely opposite a holding-down member.

This further development of the invention has the particular advantage that a selection can be made, in each individual case, as to which of two blank margins to be welded to one another is to lie on the other.

The supporting device and holding-down device according to the invention may also serve to determine the width of overlap of the body blank margins to be welded to one another. For this purpose, it may be provided that each supporting member comprises a repelling surface for the blank to be supported by it and a stop surface for the blank to be held down by a holding-down member, and each holding-down member has a repelling surface for the blank to be held down by it and a stop surface for the blank to be supported by a supporting member.

Such stop surfaces however, need not be provided or, if present, need not be used as such if the two feed tables can be fed in under CNC control, transversely to the proposed weld seam and each carry at least one gripping device for a body blank and one locating stop which is arranged parallel to the proposed weld seam and can be moved out of a stop position for the preadjustment of the associated blank into a position of rest.

One example of embodiment of the invention is explained below with further details with reference to diagrammatic drawings.

Figure 2:
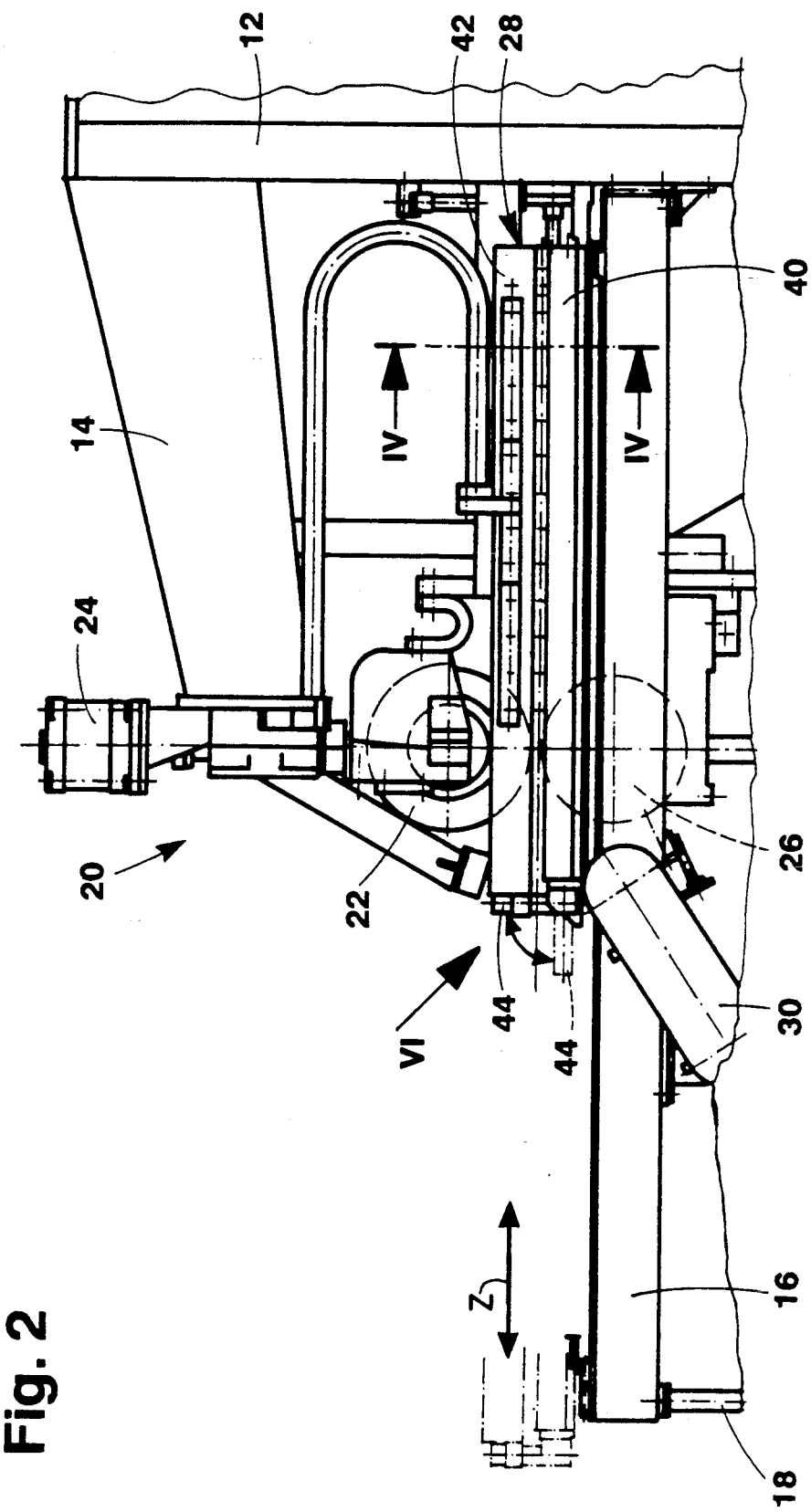
Figures 4A, 4B:
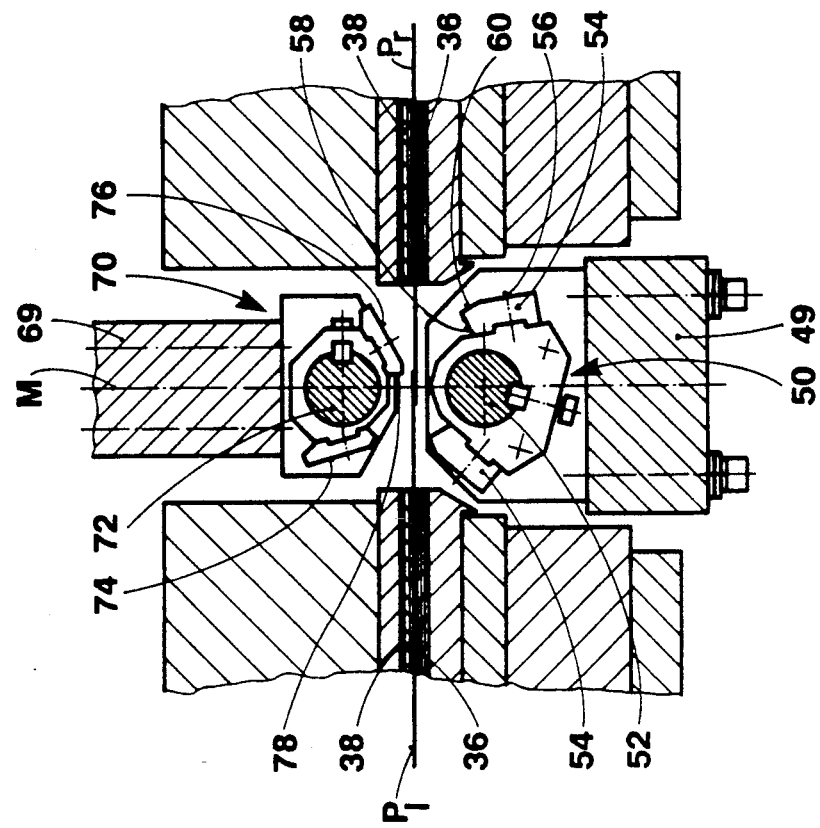
Figure 5:
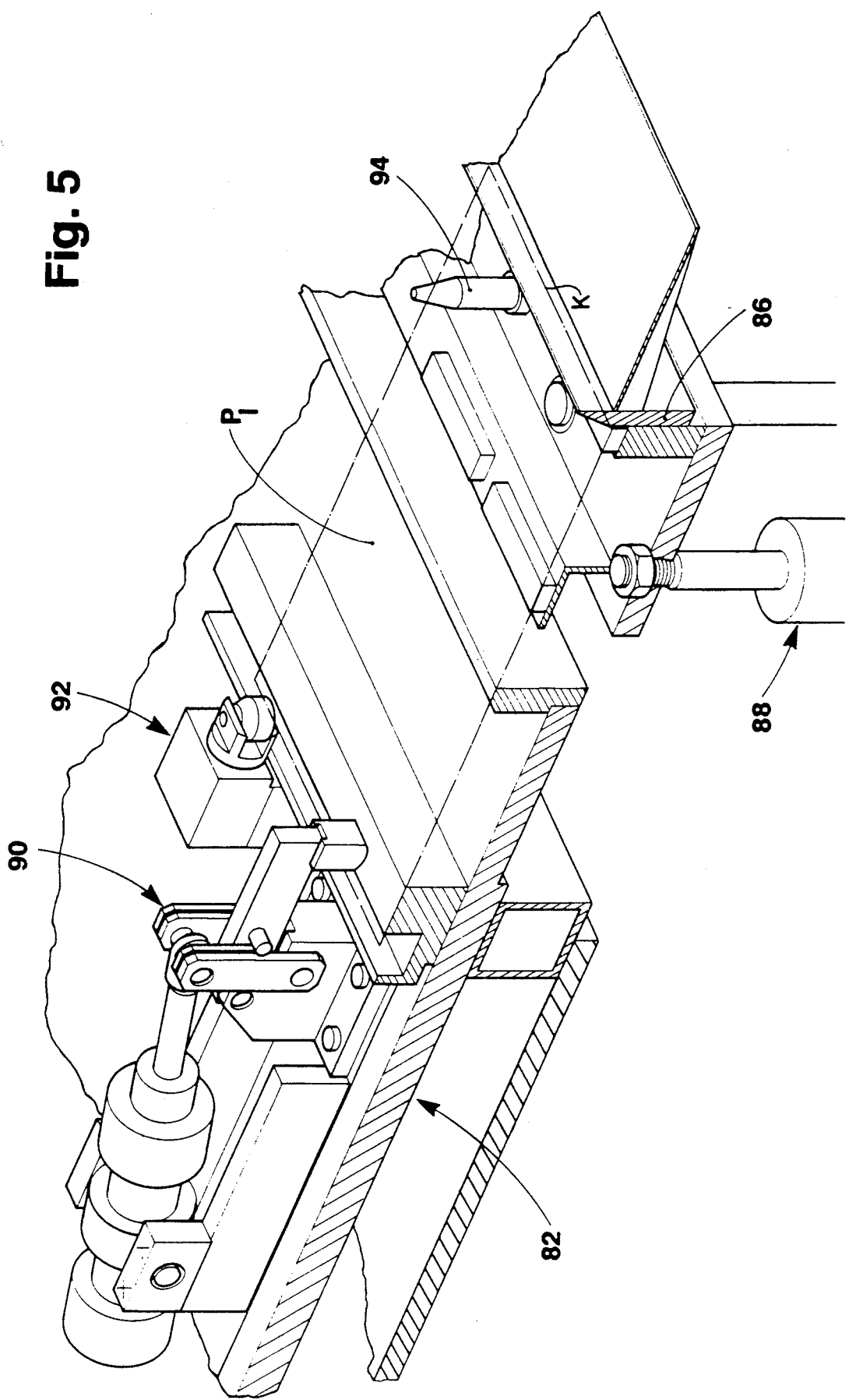
Figure 6:
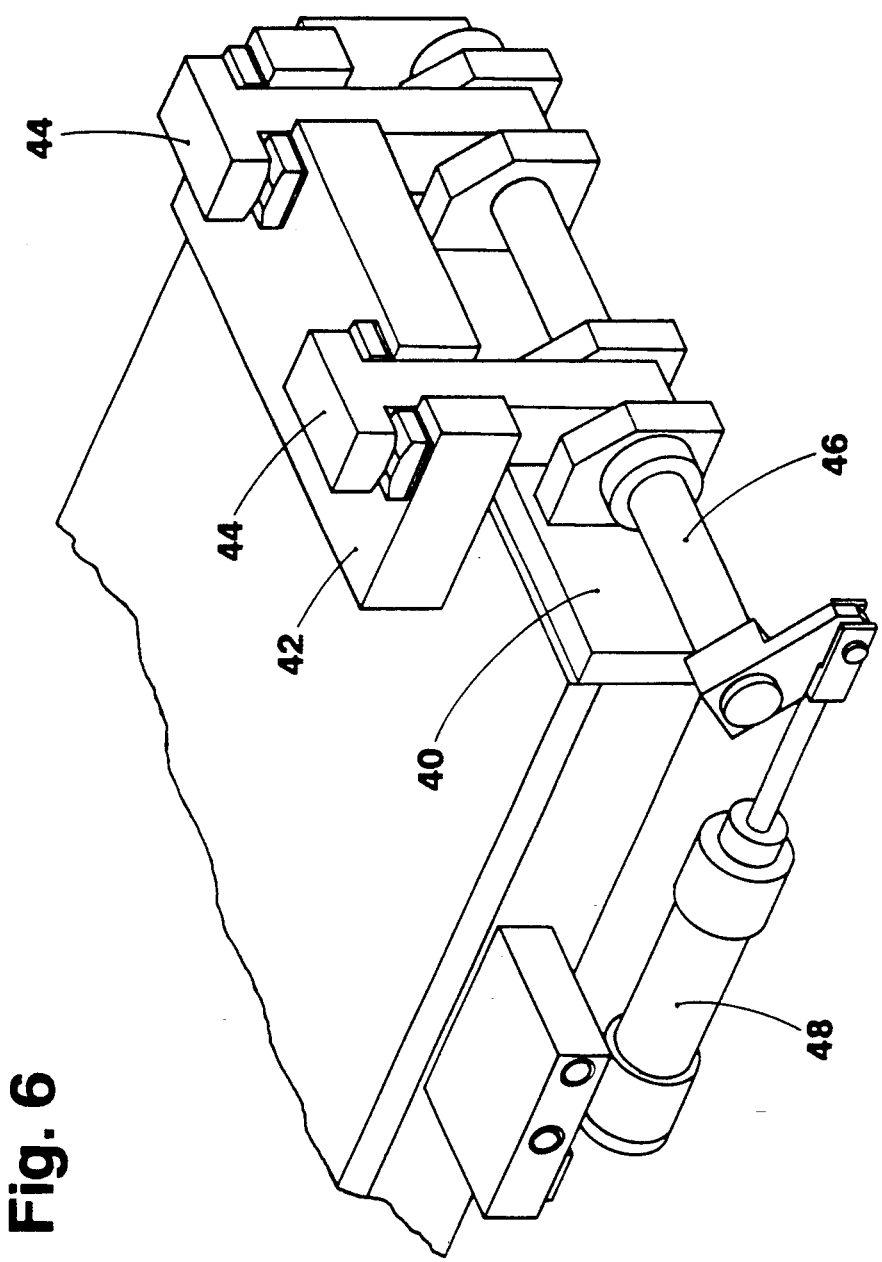

FIG. 1 shows the plan view of a body blank welding machine according to the invention, FIG. 2 shows the side view in the direction of the arrow II in FIG. 1, FIG. 3 shows the oblique view of part of the machine in the direction of the arrow III in FIG. 1, FIG. 4a shows the vertical section IV—IV in FIG. 2 in a first operating position, FIG. 4b shows the same section in a second operating position, FIG. 5 shows the oblique view in the direction of the arrow V in FIG. 1 and FIG. 6 shows the oblique view in the direction of the arrow VI in FIG. 2.

The machine illustrated has a central machine portion 10 with a column 12 from which an upper arm 14 and a lower arm 16 extend in the same direction. The lower arm 16 rests on additional supports 18. Disposed on the central machine portion 10 is a stationary welding device 20; this includes an upper electrode roller 22, which is mounted for adjustment in height by means of a pressure device 24, close to the free end of the upper arm 14, and a lower electrode roller 26 which is mounted vertically below the upper electrode roller 22 on the lower arm 16. The two electrode rollers 22 and 26 are each rotatable about a horizontal axis and are disposed at least approximately in a common vertical plane which is the central plane M of the whole welding machine as well.

A welding carriage 28 is guided on the lower arm 16 for horizontal displacement in the said central plane M and can be moved, by means of a drive 30, out of a position of rest represented in full lines in FIG. 2, close to the column 12, into an end position indicated in chain lines. Disposed on the welding carriage 28, at each side of the central plane M and parallel to this, is a clamping device 32 and 34. The two clamping devices 32 and 34 are symmetrically formed and arranged in relation to the central plane and each have one or more lower clamping jaws 36 and one or more upper clamping jaws 38. The lower clamping jaws 36 are secured to a lower beam 40 of the welding carriage 28. The upper clamping jaws 38 are supported, for adjustment in height in accordance with the arrows y in FIG. 4a, for example by means of hydraulic piston-and-cylinder units, on a horizontal upper beam 42 which extends in the central plane M, is rigidly secured to the welding carriage 28 at its end adjacent to the column 12 and ca be locked to the lower beam 4 at its opposite end as shown in FIG. 6.

Hooks 44 serve for the locking and are mounted eccentrically on a shaft 46 which extends normally to the central plane M and is in turn mounted on the lower beam 40. The shaft 46 can be turned backwards and forwards between a locking position and a release position by means of a piston-and-cylinder unit 48. In the locking position, which is represented in FIG. 6, the hooks 44 connect the lower beam 40 to the upper beam 42 in such a manner that its front end, illustrated in FIG. 6, cannot flex upwards on actuation of the clamping devices 32 and 34. In the open position, which is indicated by chain lines in FIG. 2, the hooks 44 leave a gap free between the lower beam 40 and the upper beam 42.

Disposed in the central plane M, that is to say between the two clamping devices 32 and 34, is a lower bearer 49 which projects horizontally away from the column 12 and serves as a current-conducting feed line to the lower electrode roller 26. Mounted on the bearer 49 is a supporting device 50 which comprises a shaft 52 having its axis lying horizontally in the central plane M. Secured to the shaft 52 are two rail-shaped supporting members 54 which are symmetrical with one another and which consist of hardened steel. The supporting members extend approximately over the whole length of the shaft 52 and each has a repelling surface 56 as well as a stop surface 58 and a supporting surface 60. The stop surface 58 extends at right angles to the supporting surface 60 and this forms an obtuse angle of about 160° with the repelling surface 56. By turning the shaft 52, each of the supporting members 54 can be brought selectively into a supporting position as shown in FIG. 4a or into a position of rest as shown in FIG. 4b. An actuating device 62, for example a piston-and-cylinder unit, is provided to turn the shaft 52, and is connected to the shaft 52 via a lever 64. In the example illustrated, the supporting position and the position of rest of the left-hand supporting member 54 in FIGS. 3 and 4 are determined by adjustable stops 66 and 68.

Disposed vertically above the supporting device 50, that is to say likewise between the two clamping devices 32 and 34, is an upper bearer 69 which projects horizontally away from the column 12 and serves as a current-conducting feed line to the upper electrode roller 22. Mounted on the bearer 69 is a holding-down device 70 which comprises a shaft 72 having its axis lying horizontally in the central plane M and having two holding-down members 74 which are symmetrical with one another. The holding-down members 74 are likewise made of hardened steel and, in a corresponding manner to the supporting members 54, each has a repelling surface 76, a stop surface 78 and a supporting surface 80 lying between these first two surfaces. According to FIGS. 3, 4 and 4a, the shaft 72 is fixed in an angular position in which its right-hand holding-down member 74 assumes a holding-down position. The shaft 72 can be turned out of this angular position, either by hand or by a device which corresponds to the actuating device 62, into a position in which its left-hand holding-down member 74 in FIGS. 3, 4a and 4b is effective. This turning is combined with a turning of the shaft 52 in the opposite direction and leads to the fact that the right-hand supporting member 54 is situated obliquely opposite the left-hand holding-down member 74.

Disposed at each side of the central machine portion 10 is a feed table 82 or 84 respectively. These two feed tables 82 and 84 may be stationary and comprise for example roller conveyors or ball slides on their upper surface, which render it possible to displace a body blank $P_l$ and $P_r$ respectively almost without friction in the direction of the arrows $x_l$ and $x_r$ respectively towards the central portion 10. In the example illustrated, however, the two feed tables 82 and 84 can themselves be fed in, in the directions $x_l$ and $x_r$, and are each adapted for the pre-location of the body blank $P_l$ or $P_r$ respectively.

For this purpose, a CNC-controlled drive of conventional type is associated with each of the feed tables 82 and 84. Furthermore, each of the feed tables 82 and 84 has a locating stop 86 which extends parallel to the central plane M and hence parallel to the proposed welding direction z and can be lowered, by means of an adjusting drive 88, out of its stop position represented in FIG. 5 into an inoperative position. Disposed on each of the two feed tables 82 and 84, at a distance from the locating stop 86, are clamping devices 90 and pressure devices 92 for one of the body blanks $P_l$ or $P_r$ in each case. Finally, each of the feed tables 82 and 84 carries a vertical pin 94 whereby a specific position of the body blanks $P_l$ or $P_r$ in question can be fixed.

In order to weld the two body blanks $P_l$ and $P_r$ together, each of them is deposited, for example by means of a handling device 96 of the kind indicated in FIG. 1, on a feed table 82 or 84 and is laid, as shown in FIG. 5, with that edge K which bounds the margin to be welded of the body blank in question against the associated locating stop 86 and is held bearing against this by the associated pressure devices 92 while the body blank is displaced until it rests against the associated pin 94 as a result of which the body blanks is clearly located in relation to the associated feed table 82 or 84 respectively. Then the associated clamping devices 90 are actuated so that each of the body blanks $P_l$ and $P_r$ is clamped to the associated feed table 82 and 84 respectively. Then adjusting drives 88 are actuated so that the locating stops 86 come into their position of rest and the margins to be welded to one another of the body blanks $P_l$ and $P_r$ are exposed.

Then the feed tables 82 and 84 are moved, numerically controlled, out of their clamping position represented in FIGS. 1 and 5, at right angles to the central plane M, in the direction $x_l$ or $x_r$ respectively. In the course of this, the margin to be welded of the body blank $P_l$ shown in FIGS. 3 and 4a slides over the repelling surface 56 of the left-hand supporting member 54, which assumes its supporting position. Finally, the body blank $P_l$ comes into a welding position in which its margin rests on the supporting surface 60 and the edge K of this margin reaches a position in the immediate vicinity of the stop surface 78 of the right-hand holding-down member 74. This stop surface 78 is not, however, effective as such; it is only necessary when the feed table 82 is not CNC controlled but is formed by a roller conveyor for example.

In a corresponding manner, the body bland $P_r$, after it has been adjusted and clamped on the feed table 84, is displaced towards the left by the movement of the table in the direction of the arrow $X_r$, during which its margin to be welded is pressed downwards by the repelling surface 76 of the right-hand holding-down member 74 and the free edge of this margin almost reaches the stop surface 58 of the left-hand supporting member 54. As a result of the mutual correlation of the left-hand supporting member 54 and of the right-hand holding-down member 74, it is clearly determined that the margin of the right-hand body blank $P_r$ comes to lie under the margin of the left-hand body blank $P_l$.

Now the supporting device 50 is turned in counterclockwise direction out of the supporting position shown in FIG. 4a into the position of rest shown in FIG. 4b, in which the body blanks $P_l$ and $P_r$ are no longer contacted by the supporting device 50. In the course of this, the margin of the blank $P_l$ springs downwards somewhat and then lies on the margin of the blank $P_r$ in a plane which is determined by the two clamping devices 32 and 34, while the two blanks are no longer contacted by the holding-down device 70 either. Then the two clamping devices 32 and 34 are actuated as a result of which the two body blanks $P_l$ and $P_r$ are located, with the prescribed overlapping, in relation to one another and to the welding carriage 38. Following on this, the clamping devices 90 and pressure devices 92 on the two feed tables 82 and 84 are rendered inoperative and the latter return to their initial position shown in FIG. 1.

Now the welding carriage 28 together with the two clamped blanks $P_l$ and $P_r$ is set in motion in the welding direction z. As soon as the front edges of the overlapping margins of the blanks $P_l$ and $P_r$ lie between the electrode rollers 22 and 26, the welding begins in accordance with a specific welding-current/electrode-force program. It is also possible to insert the blanks $P_l$ and $P_r$ in the clamping devices 32 and 34 so that the front edges of the weld seam come to lie immediately below the electrodes 22 and 26. In this case, the welding movement of the welding carriage and the welding-current/electrode force program start simultaneously.

As soon as the welding is ended, the clamping devices 32 and 34 are opened so that they release the blanks $P_l$ and $P_r$. Then the hooks 44 are swung downwards and the blanks $P_l$ and $P_r$ welded to one another are pulled out forwards between lower beam 40 and upper beam 42.

We claim:

1. A body blank welding machine having
   a central machine portion on which there are disposed two clamping devices, one for each one of two body blanks as well as a welding device for welding together overlapping margins of the blanks along a proposed weld seam,
   a drive to produce a relative movement, along the proposed weld seam, between the welding device and the clamping devices and
   two feed tables which are disposed at each side of the central machine portion and each of said two feed tables is arranged to feed a blank, transversely to the proposed weld seam, through one of the clamping devices into an overlapping position, wherein the improvement comprising disposed between the two clamping devices to support the margin to be welded of the body blank fed onto one of the two feed tables is a supporting device which is displaceable out of a supporting position in which said supporting device supports the margin of the blank associated with one of said two feed tables, into a position of rest in which said supporting device allows said margin of the blank associated with said one of the two feed tables to rest on the margin of the blank associated with the other of the two feed tables.

2. A welding machine according to claim 1, wherein the supporting device is pivotable backwards and forwards, about an axis parallel to the intended weld seam, between the supporting position and the position of rest.

3. A welding machine according to claim 1, wherein a holding-down device for the margin to be welded of the other body blank ($P_r$) is also disposed between the two clamping devices.

4. A welding machine according to claim 1, wherein
   the supporting device comprises two supporting members arranged symmetrically,
   the holding-down device comprises two holding-down members arranged symmetrically, and
   supporting device and holding-down device are pivotable backwards and forwards in opposite directions, each about an axis parallel to the intended weld seam, between two end positions in each of which a supporting member is situated obliquely opposite a holding-down member.

5. A welding machine according to claim 4, wherein
each supporting member has a repelling surface for the body blank ($P_l$) to be supported by it, and a stop surface for the body blank ($P_r$) to be held down by a holding-down member, and each holding-down member has a repelling surface for the body blank ($P_r$) to be held down by it and a stop surface for the body blank ($P_l$) to be supported by a supporting member.

6. A welding machine according to claim 1, wherein the two feed tables are feedable under CNC-control, transversely to the proposed weld seam, and each carries at least one clamping device for a body blank and a locating stop which is arranged parallel to the proposed weld seam an is displaceable out of a stop position for the pre-adjustment of the associated body blank into a position of rest.

* * * * *